United States Patent [19]

Kartalopoulos

[11] Patent Number: 5,289,467
[45] Date of Patent: Feb. 22, 1994

[54] MANHATTAN STREET NETWORK WITH LOOP ARCHITECTURE

[75] Inventor: Stamatios V. Kartalopoulos, Annandale, N.J.

[73] Assignee: AT&T Bell Laboratories, Murray Hill, N.J.

[21] Appl. No.: 618,447

[22] Filed: Nov. 27, 1990

[51] Int. Cl.$^5$ .............................................. H04J 3/08
[52] U.S. Cl. ................................. 370/85.5; 370/85.4; 370/85.9; 370/85.12; 370/85.13; 370/85.14; 340/825.5; 340/825.51
[58] Field of Search ................ 370/85.14, 85.12, 85.4, 370/85.5, 85.9, 85.13; 340/825.5, 825.51

[56] References Cited

U.S. PATENT DOCUMENTS

| | | | |
|---|---|---|---|
| Re. 31,852 | 3/1985 | Olof | 370/90 |
| 4,539,679 | 9/1985 | Bux et al. | 340/825.5 |
| 4,672,373 | 6/1987 | Mori et al. | 370/85.12 |
| 4,736,465 | 4/1988 | Bobey et al. | 370/85.12 |
| 4,742,511 | 5/1988 | Johnson | 370/85.9 |
| 4,797,882 | 1/1989 | Maxemchuk | 370/85.12 |
| 4,933,933 | 6/1990 | Dally et al. | 370/85.12 |
| 4,979,167 | 12/1990 | McCool | 370/85.4 |
| 5,031,174 | 7/1991 | Natsume | 370/85.5 |

OTHER PUBLICATIONS

*AT&T Technical Journal*, vol. 64, No. 7, "Regular Mesh Topologies in Local and Metropolitan Area Networks," by N. F. Maxemchuk, pp. 1659-1685, Sep. 1985.

*Primary Examiner*—Douglas W. Olms
*Assistant Examiner*—Russell W. Blum
*Attorney, Agent, or Firm*—Richard D. Laumann

[57] ABSTRACT

A network is described which has a Manhattan Street architecture that is implemented using a token ring system, such as the fiber distributed data interface, with the primary and secondary rings representing vertical and horizontal lines, respectively.

4 Claims, 4 Drawing Sheets

MANHATTAN STREET NETWORK WITH LOOP ARCHITECTURE

TECHNICAL FIELD

This invention relates to local area networks having a Manhattan Street architecture.

BACKGROUND OF THE INVENTION

In response to a market demand for the ability to transmit data, typically over relatively short distances, local area networks (LANs) have been developed. LANs are telecommunications networks which interconnect a plurality of stations which are typically located in a relatively compact geographical area. In contrast, the long distance telecommunications network spreads over an enormous geographical area. The differences, e.g., geographical area, between the two types of networks frequently lead to design differences. For example, the physical location of nodes, i.e., a point where two or more fines intersect, is determined primarily by geography in long distance networks but in LANs the location of nodes is frequently determined by other considerations, such as the frequency of communications between two stations, i.e., how frequently two stations talk to each other, transmission medium, transmission delays, etc., rather than by geography.

In attempts to optimize the efficiency of LANs, different topological configurations have been developed. These configurations include star, ring, bus, and tree. A discussion of all of these topologies will not be given because it is not required to understand this invention. Ring or loop systems will be discussed because they are relevant to the invention. A loop system has a plurality of serially connected stations in a ring. For a description of such a system see, e.g., U.S. Pat. No. 4,293,948 issued on Oct. 6, 1981. The loop configuration is simple and straightforward because each station is connected directly to the loop, but consideration of the requirements for efficient operation shows that the system should have an orderly means of determining which station transmits information and which station receives the information. One means that has been developed is termed the token. During system operation, a station waits until it receives the token and transmits only while it possesses the token. The addressed station copies the information while nonaddressed stations regenerate the signal and transmit it to the next station on the loop. The originating station removes the information from the loop after one trip around the loop. Token rings may be either synchronous or asynchronous.

The loop system described is unidirectional and consequently suffers several drawbacks, including single paths between two stations, thereby rendering the system subject to catastrophic failure and decreased efficiency if some portions of the loop are used more extensively than are other portions. To overcome these drawbacks, as well as for other reasons, bidirectional loop systems, such as the fiber distributed data interface, have been developed. This system, commonly referred to by the acronym FDDI, is a token ring network which uses two rings that are referred to as the primary and the secondary ring. Information flows in opposite directions in the two rings, but only one loop is typically used in the absence of faults. The stations are designated as either Class A or Class B stations. Class A stations have two inputs and two outputs with one out of each connected to the primary ring and to the secondary ring. Class B stations have a single input and a single output and are connected only to the primary ring. Each station can identify faults in the rings and initiate steps so that the network reconfigures itself and remains in operation,: i.e., the system uses distributed control.

While this system is advantageously employed in many situations, it and other loop systems suffer from several limitations. One of the two rings is generally used more than the other ring, thus lowering system utilization. Furthermore, each station has means for switching packets, i.e., a defined set of bits, between the primary ring and the secondary ring which is generally used only if faults are present. Thus, this switching means, as well as the means for transmitting packets on the secondary loop, is not much used in the absence of faults. Also, any two stations are connected by a very limited number of possible paths, and the number does not increase as the number of stations increases. Furthermore, transfers between loops are accomplished with apparatus termed bridges which occupy positions on the loop but perform no station functions.

Several of these limitations can be avoided by the use of mesh networks. Such networks have pluralities of intersecting horizontal and vertical lines, i.e., paths, with a station or other apparatus located at the points of intersection or nodes. A mesh network thus has a plurality of point-to-point communication paths or channels. Mesh networks are advantageously employed, as compared to loop networks, because they provide numerous alternative paths between stations, thus making the network more resistant to faults than are loop systems and providing alternative routes in times of heavy usage. One mesh network is termed the Manhattan Street Network and is commonly referred to by the acronym MSN. See, e.g., the article by Maxemchuk in *A.T.&T. Technical Journal*, pp. 1659–1685, September 1985 for a detailed description of an MSN. The name MSN is descriptive of the network because it is a mesh with a first plurality of paths running horizontally and a second plurality of paths running vertically. The first and second pluralities are referred to as streets and avenues, respectively, because streets and avenues in the city of Manhattan run generally east-west (horizontal) and north-south (vertical), respectively. Each point where the first and second pluralities intersect is a node with two inputs and two outputs. Each packet is identified by two coordinates (one for the row and one for the column) for the source and by two coordinates for the destination. The MSN is a relatively efficient system because there is a choice of routes between the source and destination, thereby permitting both faulty routes and busy nodes to be avoided.

The relatively economical use of system resources and ease of switching present in MSN networks has not been realized in token loop systems.

SUMMARY OF THE INVENTION

A telecommunications network is described which has a plurality of primary token rings being generally arranged in a first direction and forming a plurality of rows; at least one secondary token ring being generally arranged in a second direction and forming at least one column; and a plurality of stations, each comprising first and second pairs of input and output terminals. The first pair and the second pair of the input and output terminals are connected to a primary ring and a secondary ring, respectively. Each of the stations further comprises means for switching packets between a primary and a secondary ring, whereby a plurality of rings are arranged in a Manhattan Street Network.

The stations also comprise means for handling tokens in both rings connected to the station. In one embodiment, at least one of the rings comprises an optical fiber. In another embodiment, the network has a plurality of secondary token rings. In a preferred embodiment, at least one of the primary rings and at least one of the secondary rings are connected to the same station and form a fiber distributed data interface network. In a further preferred embodiment, at least one of the stations comprises a concentrator and the network further has a local area network connected to the concentrator. In yet another embodiment, the stations in the network comprise means for determining routes between source and destination stations.

DETAILED DESCRIPTION

Figure 1:
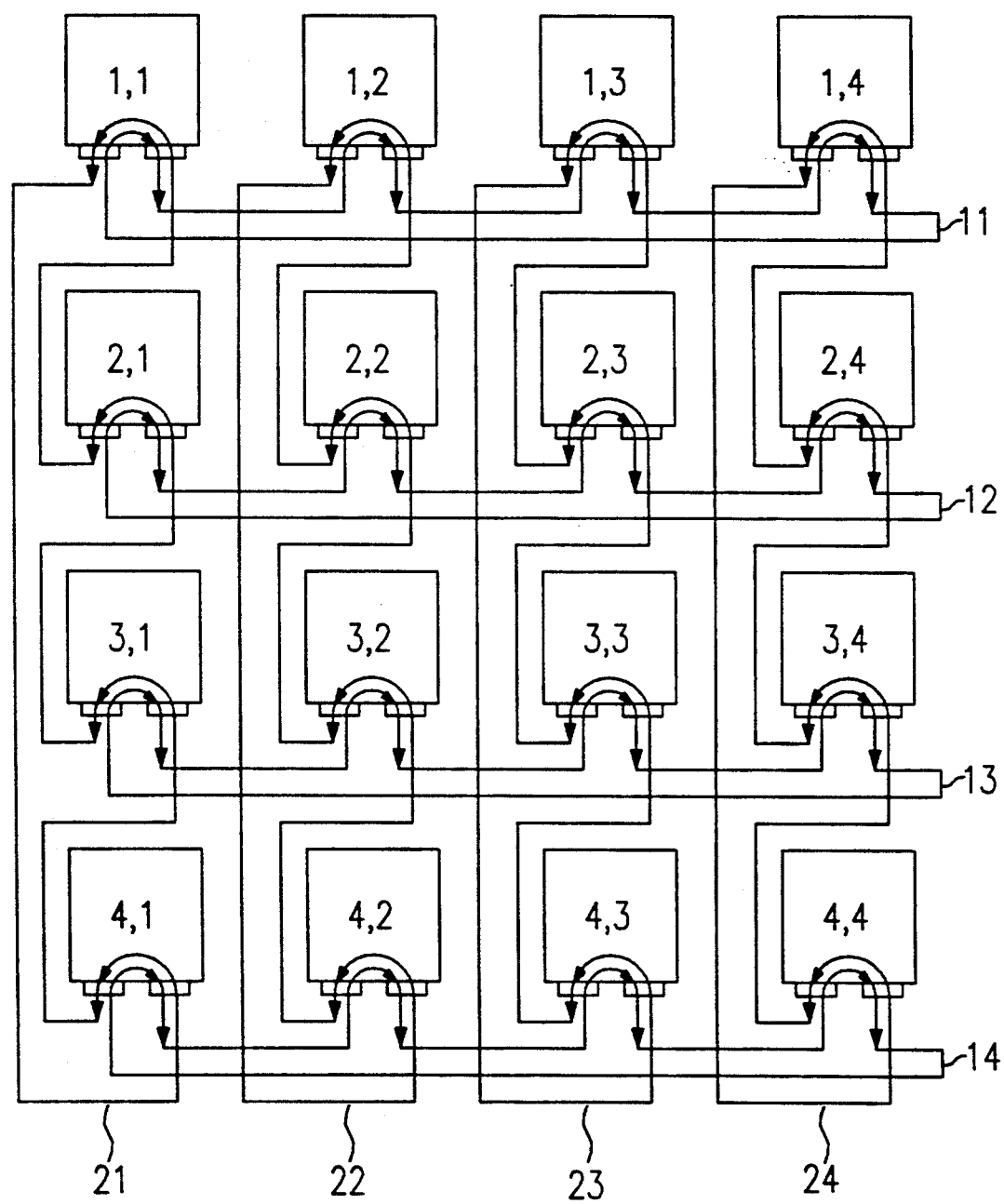
FIG. 1 illustrates a M-FDDI network according to this invention.

The configuration of an exemplary token loop network according to this invention is depicted in FIG. 1. The network shown is a 4×4 FDDI network, i.e., it has 16 stations and 4 loops 11-14 arranged generally in a first direction (horizontal) and 4 loops 21-24 arranged generally in a second direction (vertical). The 16 stations can be referred to individually as stations (ij), where i represents the ith row (i=1,2,3,4) and j represents the jth column (j=1,2,3,4). The stations are thus interconnected by a plurality of generally horizontal (first direction) loops 11-14 and a plurality of generally vertical (second direction) loops 21-24. Each horizontal loop and each vertical loop represent a row and a column, respectively. Both the horizontal and vertical loops pass through the stations as schematically indicated. Each station has first and second pairs of input and output terminals with the first and second pairs being connected to the primary and secondary loop, respectively. In conformance with the FDDI terminology discussed, the horizontal and vertical loops can be referred to as primary and secondary rings, respectively, or vice versa. Thus, the primary and secondary rings are arranged in first and second directions, respectively. It will be appreciated that the rings are token rings: and that the direction refers to direction of packet propagation, indicated by the arrows on the loops, on the drawing and need not correspond to geographical direction. The network depicted can handle both voice and data as well as the necessary signal and control information. The choice of the ring designated as primary is arbitrary in describing the network. That is, the terms primary and secondary are interchangeable in describing the network.

The network depicted is a combined MSN and FDDI network which, for reasons of brevity, may be referred to as a M-FDDI network. That is, the nodes of a FDDI primary ring are the stations on a row or street and the nodes of a FDDI secondary ring are the stations on a column or avenue. Of course, bidirectional token ring systems other than FDDI may be used. Both the primary and secondary rings are utilized at the same time and each ring may have a token at the same time. Both primary and secondary rings will have comparable utilization and thereby increase system utilization, as compared to the conventional bidirectional ring system. All rings may operate at the same time. The ring, i.e., transmission media, is formed from optical fibers. The network depicted is an idealized symmetrical network. In practice, the network need not be symmetrical, i.e., it need not have the same number of rows and columns, and may have, e.g., missing nodes (stations) and/or partial rows or partial columns. Although the node capacity of the network depicted is small because the network depicted itself is small, the capacity of actual networks may be enormous and will frequently be larger than that of the network depicted. For example, if each FDDI loop can support n nodes, the capacity of the network is n x n if all possible nodes have stations.

Figure 2:
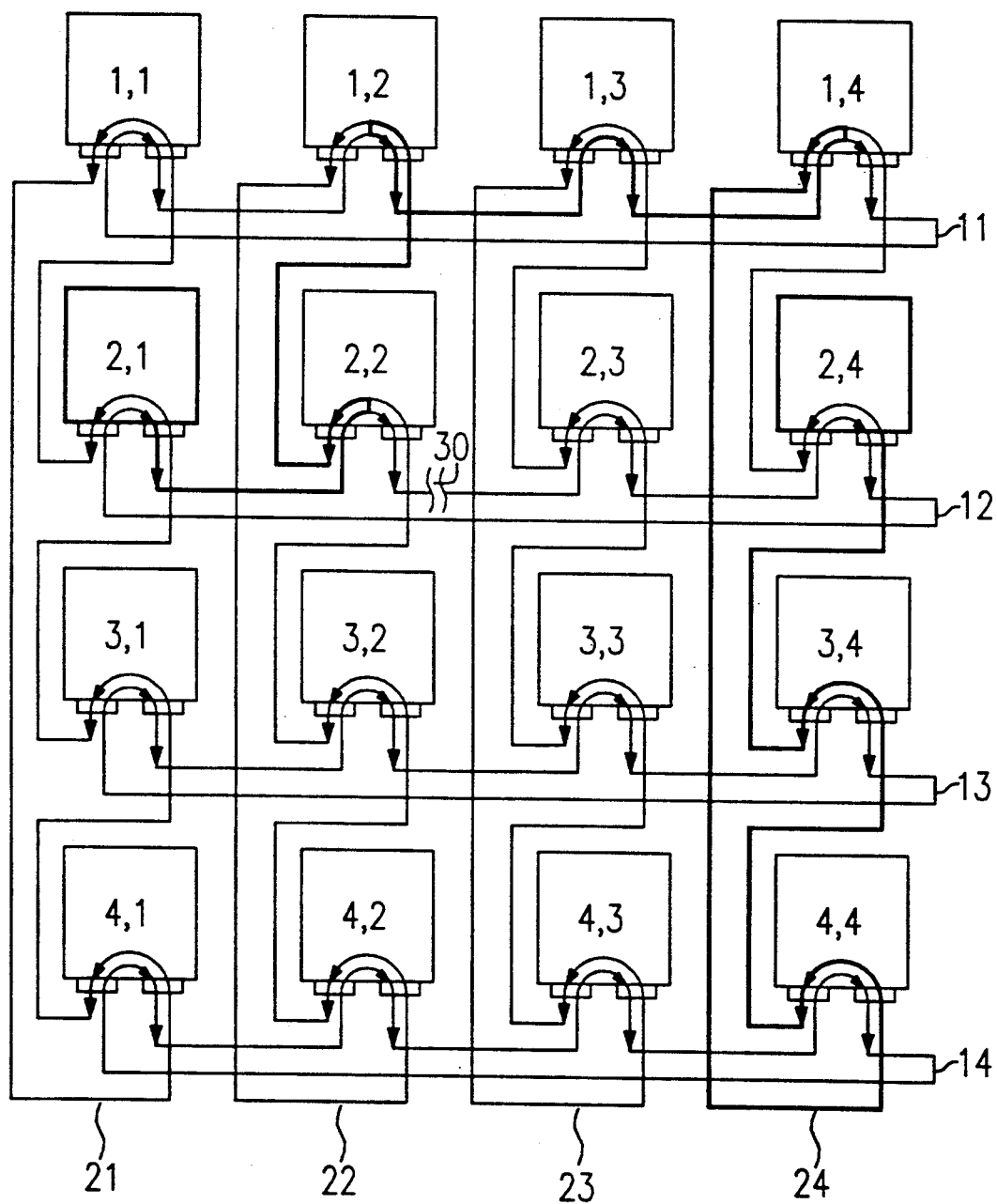
FIG. 2 illustrates a reconfiguration of the M-FDDI network to bypass a fault in the network.

Although the network is a token ring network, it is configured as a mesh network and has the high degree of fault tolerance typical of the networks as will be apparent after consideration of FIG. 2. The network depicted is the same network that was depicted in FIG. I except for the fault 30, e.g., break, in horizontal loop 12 between station (2,2) and station (2,3). Assume that station (2,1) wants to communicate with station (2,4). It cannot do so entirely on loop 12 because of the fault. The packets must change from one loop to another loop to avoid the fault, and a switching function occurs as the packets move from loop to loop. An illustrative alternative loop is shown in bold face lines in FIG. 2. More particularly, the packet moves, e.g., from station (2, 1) to station (2,2) where it switches to vertical loop 22 and moves to station (1,2). It then switches to horizontal loop 1 1 and moves to stations (1,3) and (1,4). At the latter station, it switches to vertical loop 24 and goes through station (4,4) and (3,4) to reach station (2,4). This is only one of many possible routes.

The optimum path, both with and without faults, depends upon the number of interloop transfers rather than the number of intrastation transfers because the switching function, including buffering, performed when packets are moved from one loop to another loop is less efficient than is moving packets from station to station on the same loop. The packets rotate around a loop, as they do in any token ring system, and a switching function occurs only when the packets move from one loop to another loop. Thus, when a packet is switched from a primary loop to a secondary loop, the node must perform switching functions such as address recognition, route determination, buffering of packets, and copying of the packet from one ring to the other ring. The node does not initially know whether switching must occur, so some buffering of the incoming packet is performed until the destination address is decoded. Buffering is also required until the destination address of the token for the second loop is received and the packet may be transmitted.

Figure 3:
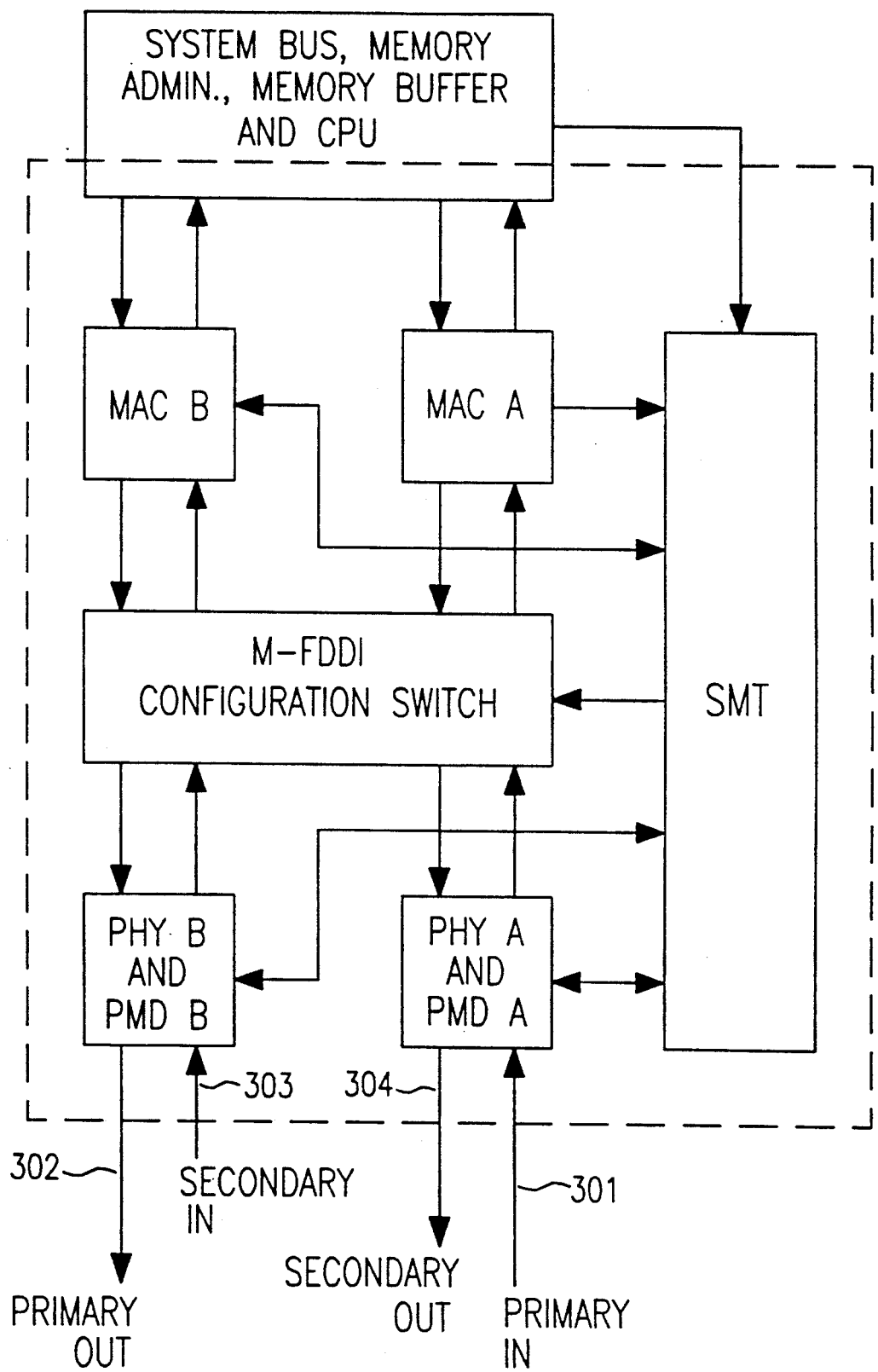
FIG. 3 is a schematic illustration of the architecture of a node.

FIG. 3 is a schematic representation of the architecture of a node, i.e., station, according to this invention. Depicted are primary input and output 301 and 302, respectively, and secondary input and output 303 and 304, respectively. Further depicted are the conventional and well-known portions of the FDDI station specification, including the following four portions: the physical layer medium dependent (PMD) A and B, the physical layer protocol (PHY) A and B, the medium access control (MAC) and the station management (SMT). The PNM corresponds to the lower sublayer of the open system interconnect (OSI) physical layer and specifies the optical transmitter and receiver. The PHY corresponds to the upper sublayer and specifies the PHY functions. The MAC protocol corresponds to the lower sublayer of the OSI data link layer and defines rules for medium access, addressing, frame formats, error checking and token management. The SMT standard specifies system management functions and the control required for the best performance or connectivity requirements of a station on the FDDI network. It also includes components for control of the token as well as means for determining routes between two stations. Also depicted are the system bus, memory administration, memory, buffer, and central processor unit. The station is generally equivalent to two stations, i.e., one station for the primary ring and one station for the secondary ring with a switching function also present. The components depicted will, when necessary, switch packets from the primary ring to the secondary ring and vice versa. The components also manage the token. These components are well known to those skilled in the art and further description is not required for those skilled in the art to implement this invention.

Several comments about route selection are appropriate. Distributed control is used. Single ring routes will be termed zero degree routes; two ring routes will be termed first degree routes; three ring routes will be termed second degree routes, etc. The degree is equal to the number of switches which is one less than the number of rings in the route. No-fault conditions will be considered first. When possible routes are considered by the originating station, the route of lowest degree has highest priority and is usually selected. In the general case where, source and destination are not on the same token ring, there are two first-order routes and they are equivalent. One route transmits horizontally and then vertically and the other route transmits vertically and then horizontally, i.e., a primary ring is used and then a secondary ring is used or vice versa. Generally, the originating station, i.e., source node, will choose a first degree route and transmit the packets on the selected loop. The packet propagates on this loop until it reaches a node having a coordinate which matches one of the destination coordinates. The packet is copied onto the ring with the same coordinate. The packet propagates on this ring until the destination is reached.

Route selection with faults present is generally similar to the process just described and that described with respect to FIG. 2. However, at each node a determination is made as to whether either of the next two neighboring nodes is faulty. If not, the packet is sent to the next node on the same loop. If yes, the packet is switched to the loop with the operating node rather than to the loop with the fault.

Those skilled in the art who understand how to initialize a FDDI network will readily understand how to initialize the network described. For example, either the horizontal or vertical loops may be first initialized. The vertical or horizontal loops are then initialized using the values obtained for the nodes in the first initialization. The process is continued until the values obtained converge to the desired degree.

Figure 4:
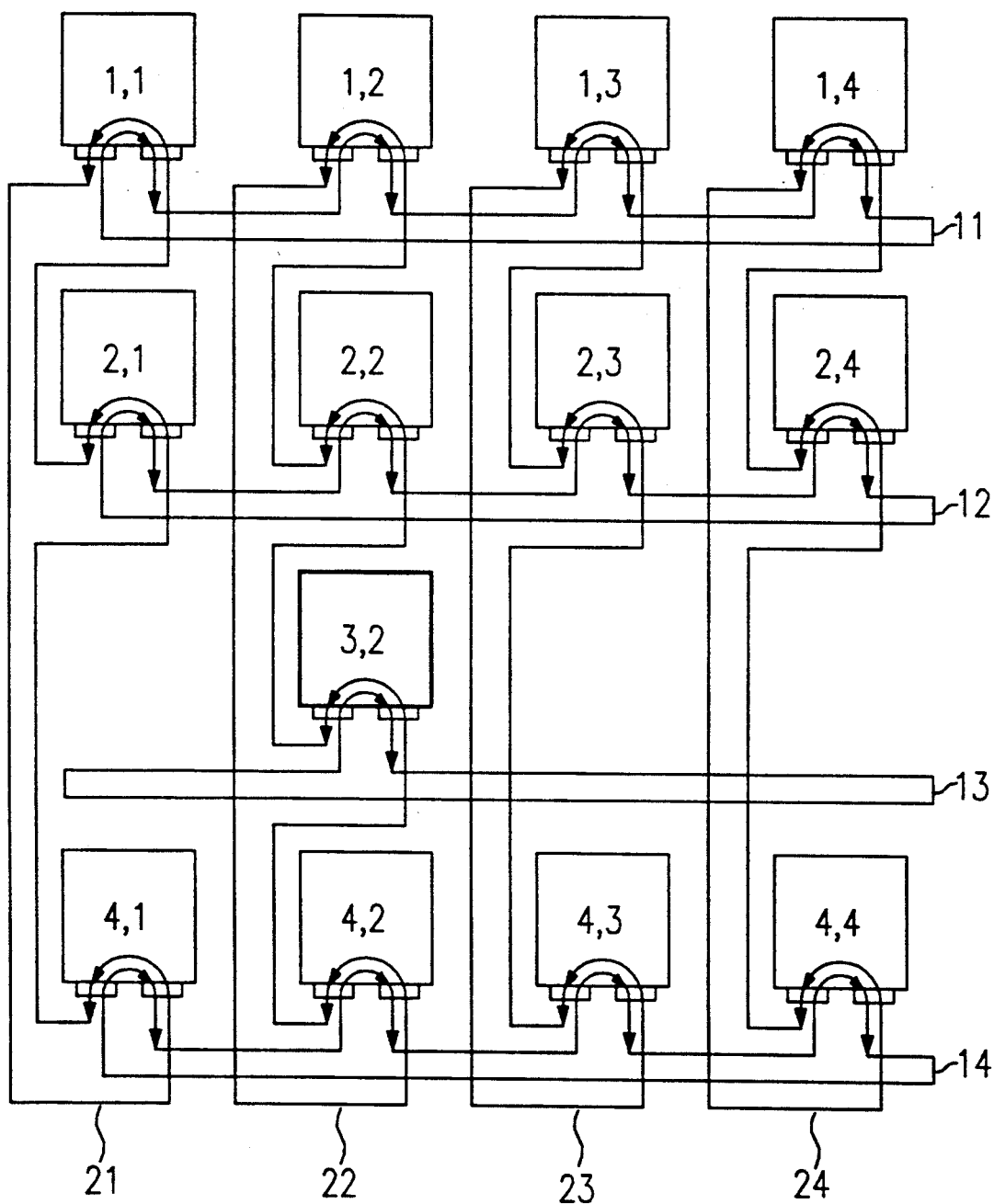
FIG. 4 illustrates the addition of a node to the network.

The addition of a node to the network is relatively simple as will be appreciated after consideration of FIG. 4. The network depicted is similar to that depicted in FIG. 1 except that horizontal loop 13 was originally absent and was added to the original configuration of the network to accommodate station (3,2). That is, the original network was a 3×4 network and did not have station (3,2). In general, new stations may be added to either a vertical loop or to a horizontal loop. If the station is added to a vertical loop between two stations, a new horizontal loop is created with the new station as its sole station. If the new station is added to a horizontal loop, a new vertical loop is created with the new station as its sole station.

The invention has been described with respect to a two-dimensional implementation, but it can be implemented in three dimensions using standard expansion practices. A brief discussion of how the network can be extended to a multistory building will suffice to illustrate the general principles. The building is represented by a Class A concentrator or hub. Class B stations within the building are connected to the concentrator thereby adding a vertical dimension to the two horizontal dimensions already present. Of course, topologies other than rings, e.g., stars or trees, may be used in the third or vertical dimension.

Variations of the embodiments described will be readily thought of by those skilled in the art. For example, although FDDI is implemented with optical fiber, the invention may be practiced with other transmission media, such as copper wires and free space, and other loop configurations. Additionally, although the invention was discussed in terms of LANs, it may also be implemented with long-distance networks.

I claim:

1. A telecommunications network comprising:
a plurality of primary token rings, said primary rings being generally arranged in a first direction and forming a plurality of rows;
at least one secondary token ring, said at least one secondary token ring comprises a plurality of secondary token rings being arranged in said second direction and forming a plurality of columns; at least one of said rings comprises an optical fiber; at least one of said primary rings and at least one of said secondary rings are connected to the same station, and said station comprises a fiber distributed data interface station;
a plurality of stations, each of said stations comprising first and second pairs of input and output terminals, said stations being interconnected by said plurality of primary rings and said plurality of secondary rings, said first pair and said second pair of said input and output terminals being connected to a primary ring and a second ring, respectively, each of said stations further comprising means for switching packets between said primary and said secondary rings whereby said plurality of primary token rings and said at least one secondary token ring are arranged in a Manhattan Street Network.

2. A network as recited in claim 1 in which at least one of said stations comprises a concentrator; and said network further comprises a local area network connected to said concentrator.

3. A network as recited in claim 2 in which said stations further comprise means for determining routes between at least two stations.

4. A network as recited in claim 1 in which said stations further comprise means for handling tokens in said primary and second rings.

* * * * *